May 20, 1969      R. J. LEONARD      3,445,294

ELECTRODE BACKING PLATE FOR FUEL CELLS

Filed Oct. 20, 1965

Inventor
Ronald J. Leonard
By Edmunde D. Riedl
Attorney

United States Patent Office 3,445,294
Patented May 20, 1969

3,445,294
ELECTRODE BACKING PLATE FOR FUEL CELLS
Ronald James Leonard, Milwaukee, Wis., assignor to Allis-Chalmers Manufacturing Company, Milwaukee, Wis.
Filed Oct. 20, 1965, Ser. No. 498,309
Int. Cl. H01m 27/12
U.S. Cl. 136—86          5 Claims This invention relates to fuel cells and particularly to the means used to distribute reactant gas over an electrode surface. The invention especially relates to gas distribution means for hydrogen-oxygen fuel cells that achieve satisfactory humidity control of reactant gas.

The term fuel cell, as used herein, refers to those known electrochemical devices that convert the free energy of a chemical reaction directly to electrical energy.

In individual fuel cells, an oxidation half-cell reaction and a reduction half-cell reaction take place at spacially separated electrodes. One electrode, called the anode, is the site of the oxidation half-cell reaction. A reactant, referred to as the fuel, that is oxidizable with respect to some oxidant is supplied to the anode, and is thereat electrochemically oxidized. Oxidation of the fuel releases electrons to the anode. At the other electrode, called the cathode and spaced apart from the anode by a suitable electrolyte, the other half-cell reaction simultaneously takes place. A reactant called the oxidant, reducible with respect to the fuel, is supplied to the cathode and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte.

In practice, several individual fuel cells are coupled in cooperative electrical connection to obtain the desired output. A plurality of cells so connected is known as a module.

Production of electrical energy will continue so long as fuel and oxidant are supplied and excess products formed by the electrochemical oxidation-reduction reaction are exhausted.

Studies have shown that to obtain better performance, the reactant gas supplied to a fuel cell must be of controlled humidity. To be precise, properly humidified reactant gas must be nearly saturated with water vapor at the individual fuel cell operating temperature. This has been difficult to achieve because the temperature of the fuel cell module varies greatly between start-up and shutdown. Indeed even during steady operation, the temperatures of individual cells are not identical.

Improper humidification will upset the water balance within the module. Overhumidification will result in condensation, putting an additional load on whatever water removal system is used. Unhumidification evaporates water from the electrode and any electrolyte containment means in the region about the inlet port. During peak loads, the reactant gas flow may be sufficiently high to completely dry out portions of the electrode. Of course, no fuel cell reaction can occur on that part of the electrode that is depleted of electrolyte.

In the past, the incoming reactant gas has been passed through a humidifier external to the fuel cell module. This has not proven satisfactory because the moisture level attained is only proper for some of the individual cells. Furthermore, condensation in feed lines leading from the humidifier to the cells has been a problem.

The backing plate of my invention has the advantage that reactant gas is channeled in a pattern that humidifies the gas to the proper extent in response to internal changes in fuel cell operating temperature and thereby prevents drying out of the electrode without danger of overhumidification. My invention is particularly suitable for use with hydrogen/oxygen fuel cells that use the water removal system described in Platner Ser. No. 301,077 filed Aug. 9, 1963, now U.S. Patent 3,370,984, issued Feb. 27, 1968.

The backing plate assembly of my invention will be more fully understood by reference to the accompanying drawing in which.

Figure 1:
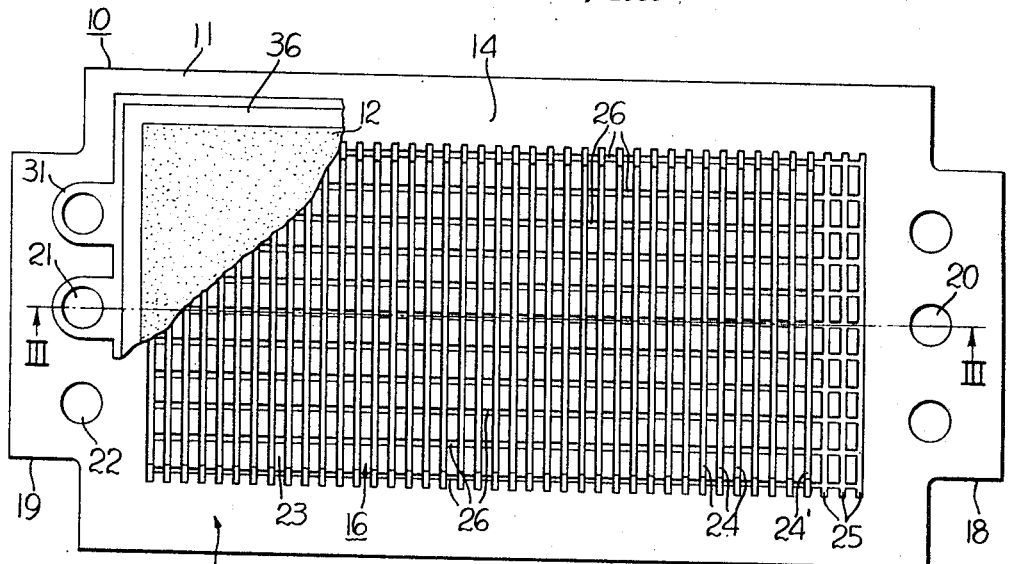
FIG. 1 is a plan view of one side of the backing plate outfitted with a fuel cell electrode.

Backing plate assembly 10 comprises plate 11 constructed from a material that is inert to any destructive chemical reaction with fuel cell reactants, products, or electrolyte. Upon one side of plate 11 is suitably mounted a fuel cell electrode 12 as shown in FIG. 1. Upon the opposite side of plate 11 as shown in FIG. 2 is suitably mounted a capillary matrix 13.

Figure 2:
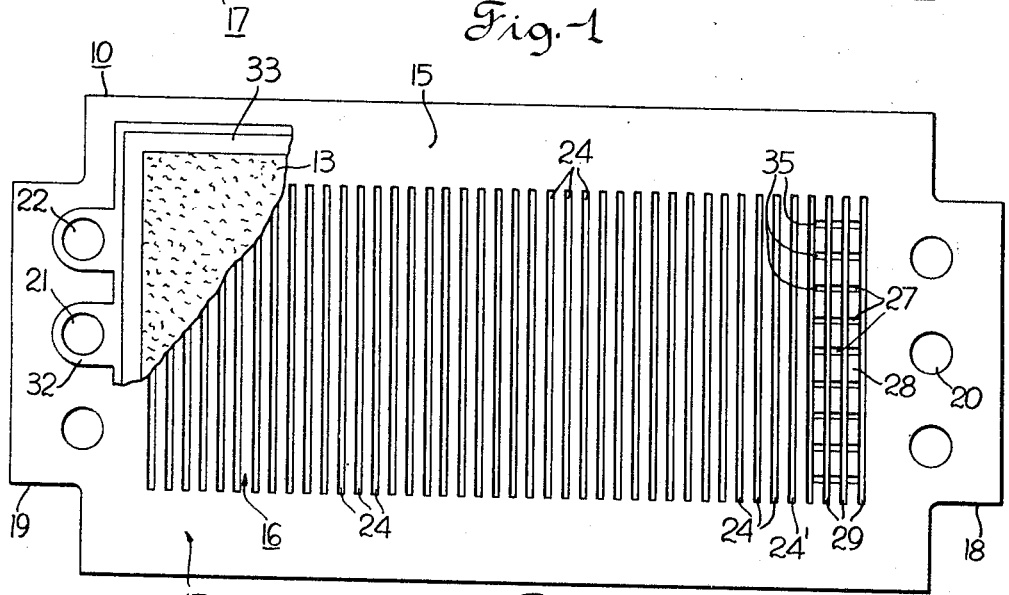
FIG. 2 is a plan view of the opposite side of the backing plate illustrated in FIG. 1 outfitted with a water removal matrix.

Referring now to FIGS. 1 and 2, the configuration of the backing plate and its construction will be explained.

Plate 11 is itself a flat sheet having on each of its two major surfaces 14, 15 a central portion 16 and a frame portion 17. At two extremities of frame portion 17 are projections 18, 19 in which are located apertures 20, 21. These apertures, together with other apertures such as aperture 22, provide for the manifold supply and purge of fuel cell reactants and products when assembly 10 is combined with other fuel cell components to form a module.

Figure 3:
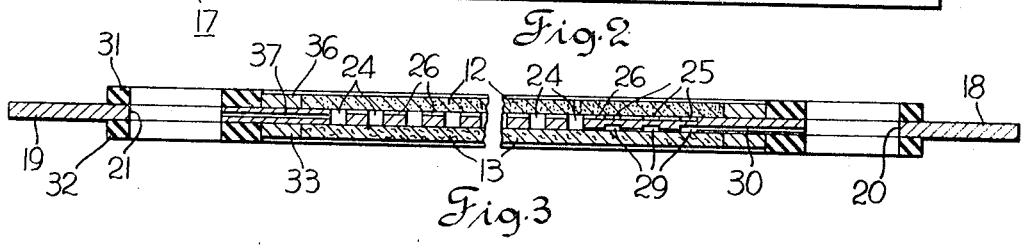
FIG. 3 is a cross sectional view through III—III of the plate shown in FIG. 1.

Referring now particularly to FIG. 1, within central portion 16 of plate 11 is a gas distribution means shown in this embodiment as grid 23. Grid 23 is designed so that only gas that has been properly humidified by prior contact with capillary matrix 13 is distributed over grid 23. To meet the primary function of grid 23 to provide a network of gas distribution pathways, it comprises a combination of slots 24, together with grooves 25 and transverse grooves 26. In this specification, the term grooves refers to indentations in plate 11 below surfaces 14, 15 while the term slots refers to more or less continuous openings through plate 11. Slots 24 and grooves 25 run substantially parallel to one another, and substantially nonparallel with the direction of flow of reactant gas into backing plate assembly 10 through inlet port 30 (shown in FIG. 3).

Transverse grooves 26 extend the entirety of central portion 16 between apertures 20, 21 thus providing between the inlet port 30 and the outlet port 37 a pathway for reactant gas across electrode 12.

Grooves 25 are located intermediate the inlet port 30 and slots 24. This placement postpones the contact of incoming gas with electrode 12 until that gas has had an opportunity to become properly humidified by prior contact with capillary matrix 13.

Electrode member 12 can be made of any suitable material, but preferred is a porous material such as sintered nickel having a heterogeneous porosity of about 85%. If nickel electrodes are used and the cell operated below 300° F., a suitable catalyst to activate the fuel cell reactant is carried on electrode 12. While many catalysts are known, the illustrated electrode is intended to activate hydrogen fuel, and platinum is deposited upon and within the porous electrode structure. Electrode 12 has a capillary potential of about 6 lbs./in.² The capillary potential of a material is defined as the differential pressure required to force liquid from its largest pore.

Affixed to frame portion 17 of plate 11 and extending about the perimeter of central portion 16 is retaining means 36. Fuel cell electrode 12 is mounted on surface 14 of plate 11, held within the confines of retaining means 36 so that it rests over grid 23. Retaining means 36, such as a flat strip of gas impermeable material, preferably electrically nonconductive, is about the same thickness as electrode 12. Surrounding the outer perimeter of retaining means 36 and manifold apertures 20, 21, 22 is a gasket means 31 to insure against cross manifold leakage and other intermingling of fuel cell reactants.

Turning now to FIG. 2, there is a gas distribution means such as grid 28 located intermediate slots 24 and the reactant gas supply through inlet port 30. Grid 28 comprises a combination of grooves 29 substantially parallel to each other and to slots 24 and nonparallel to the direction of incoming reactant gas, and transverse grooves 27. Grooves 27 intersect grooves 29 so as to provide a gas distribution means between surface 15 and a portion of capillary matrix 13.

Transverse grooves 27 terminate prior to intersecting all of slots 24. Preferably grooves 27 terminate after intersection with first slot 24', so as to thereby divert rectant gas through plate 11, and onto the fuel cell electrode distribution means.

Capillary matrix 13 rests on surface 15 of plate 11 over central portion 16. It is held in place by retaining means 33 in the same manner as electrode 12. Gasket means 32 surrounds manifold apertures 20, 21, and 22 and the outer perimeter of retaining means 33. Capillary matrix 13 is made from a fibrous material having a high capillary potential preferably in excess of 100 lbs./in². Asbestos has proven itself to be a preferred matrix material, although fibrous plastics such as polypropylene are suitable.

Although not shown on the drawing because it is considered immaterial to the invention, a support plaque of porous construction made from a material such as sintered nickel can be placed intermediate capillary matrix and plate 11.

During construction of the cell, of which assembly 10 forms a part, matrix 13 is saturated with an aqueous solution of a nonvolatile solute such as potassium hydroxide.

Of course, matrix 13 operated in conjunction with an alkaline electrolyte cell is best situated in proximity to the fuel electrode for that is where the product water is formed. In an acid electrolyte hydrogen/oxygen fuel cell, the product water forms at the oxidant electrode. Therefore, in an acid electrolyte cell, matrix 13 would preferably be associated with the backing plate on the oxygen side of the cell rather than the hydrogen side.

During operation of a fuel cell module comprising backing plate assembly 10, reactant gas is supplied through the channel formed by a plurality of manifold apertures such as aperture 20. Inlet port 30 communicates between aperture 20 and distribution grid 28 on surface 15 of plate 11. As the gas moves through the passages of grid 28, it picks up moisture from matrix 13. Because the space through which the reactant gas passes is at a water vapor pressure and a temperature nearly equal to the fuel cell operating temperature, the reactant gas becomes humidified to a level such that it will not evaporate appreciably more moisture from contact with fuel cell electrode 12. As the now humidified gas diffuses to the terminus 35 of transverse grooves 27, it passes through plate 11 through an opening such as slot 24', and then is distributed over grid 23.

The embodiments of the invention in which an exclusive property or privilege is claimed are defined as follows:

1. A fuel cell backing plate assembly comprising in combination a plate having a first and a second major surface; a gas distribution means defined within each major surface; a fuel cell electrode mounted on said first major surface; a capillary matrix mounted on said second major surface; means for supplying reactant gas to the gas distribution means defined within the second major surface for contact with the capillary matrix prior to its contacting said fuel cell electrode; and means for diverting said reactant gas after contacting said capillary matrix onto the gas distribution means defined in the first major surface and outlet means for removing gas from said gas distribution means.

2. A fuel cell backing plate assembly comprising in combination a plate having a first and a second major surface; a first gas distribution grid defined within the first major surface; a second gas distribution grid defined within the second major surface; a fuel cell electrode mounted upon said first major surface and over said first gas distribution grid; a capillary matrix mounted upon said second major surface and over said second gas distribution grid; means for supplying reactant gas first to said second gas distribution grid; means for diverting said reactant gas from said second gas distribution grid through said plate to said first gas distribution grid and outlet means for removing gas from said gas distribution grids.

3. A fuel cell backing plate assembly comprising in combination a plate having a central portion and a frame portion on each of its two major surfaces; a manifold supply aperture located in the frame portion for the supply of reactant gas; upon one major surface, a first gas distribution grid defined within the central portion thereof, said grid comprising a plurality of grooves and at least one slot substantially parallel to each other, said grooves intermediate said slot and said manifold supply aperture, and a plurality of transverse grooves intersecting said grooves and slot; upon the other major surface a second gas distribution grid defined within the central portion thereof comprising a plurality of grooves; an inlet port communicating between said manifold supply and said second gas distribution grid; said second gas distribution grid located intermediate said inlet port and said slot; a fuel cell electrode mounted over said first gas distribution grid; a capillary matrix mounted over said slot and said second gas distribution grid and outlet means for removing gas from said gas distribution grids.

4. A fuel cell backing plate assembly according to claim 3 in which said capillary matrix is asbestos.

5. A fuel cell backing plate having a central portion and a frame portion on each of its two major surfaces; a manifold supply aperture located in the frame portion for the supply of reactant gas; upon one major surface, a first gas distribution grid defined within the central portion thereof, said grid comprising a plurality of grooves and at least one slot substantially parallel to each other, said grooves intermediate said slot and said manifold supply aperture, and a plurality of transverse grooves intersecting said grooves and slot and a fuel cell electrode mounted upon said one major surface and said first gas distribution grid; upon the other major surface a second gas distribution grid defined within the central portion thereof comprising a plurality of grooves and a capillary matrix mounted upon said other major surface and said second gas distribution grid; an inlet port communicating between said manifold supply and said second gas distribution grid; and said second gas distribution grid located intermediate said inlet port and said slot and outlet means for removing gas from said gas distribution grids.

References Cited

UNITED STATES PATENTS 3,317,348   5/1967   Winsel _____ 136—86

WINSTON A. DOUGLAS, *Primary Examiner.*

H. FEELEY, *Assistant Examiner.*